United States Patent [19]
Kurose

[11] Patent Number: 5,119,490
[45] Date of Patent: Jun. 2, 1992

[54] CONCURRENT PROCESSING CONTROLLING METHOD AND APPARATUS ON B+ TREE STRUCTURE

[75] Inventor: Hiroyasu Kurose, Tokyo, Japan

[73] Assignee: Ricoh Company, Ltd., Japan

[21] Appl. No.: 778,749

[22] Filed: Oct. 18, 1991

Related U.S. Application Data

[63] Continuation of Ser. No. 515,642, Apr. 25, 1990, which is a continuation of Ser. No. 150,431, Jan. 29, 1988, abandoned.

[30] Foreign Application Priority Data

Feb. 3, 1987 [JP] Japan .................................. 62-24298

[51] Int. Cl.⁵ .............................................. G06F 15/40
[52] U.S. Cl. ............................. 395/600; 364/DIG. 1; 364/283.2; 364/246.8
[58] Field of Search ................... 395/600; 364/DIG. 1

[56] References Cited

U.S. PATENT DOCUMENTS

| | | | |
|---|---|---|---|
| 4,030,078 | 6/1977 | Kluge | 364/900 |
| 4,468,728 | 8/1984 | Wang | 364/200 |
| 4,606,002 | 8/1986 | Waisman et al. | 364/200 |

OTHER PUBLICATIONS

Bernstein et al., Concurrency Control and Recovery in Database Systems, Addison-Wesley, pp. 1-23 and 47-105.
Forgy, "Rete: A Fast Algorithm for the Many Pattern/Many Object Pattern Match Problem," 1982, pp. 17-37.
Schor et al., "Advances in Rete Pattern Matching," 1986, pp. 226-232.
Araya et al., "A Fast Pattern Matching Algorithm Using Knowledge of Exclusiveness," 1986, pp. 1-7.
Ishida et al., "A Topological Optimizer for Production System Programs," 1988, pp. 49-56.
Shinji Araya et al., "Incremental Structuring of Knowledge Base—Incremental Construction Method of Rete Network," Rete, vol. J71-D, No. 6 (1988), pp. 1100-1108.
U. S. Chakravarthy et al., "Multiple Query Processing in Deductive Databases Using Query Graphs," Proceedings of the Twelfth International Conferences on Very Large Databases, Kyoto, Japan, pp. 384-391.
Daniel P. Miranker, "Treat: A Better Match Algoithm for AI Production Systems," AI Architectures, 1971, pp. 42-47.
U. S. Chakravarthy et al., "Semantic Query Optimization in Expert Systems and Database Systems," Expert Database Systems, Benjamin/Cummings Publishing Company, Ltd., 1986, pp. 659-674.
W. F. Clocksin, "A Technique For Translating Clausal Specifications of Numberical Methods Into Efficient Programs," ACM Transactions on Database Systems, vol. 13, No. 1, Mar. 1988, pp. 231-242.
Sreekumar T. Shenoy et al., "A System for Semantic Query Optimization," ACM, Association of Computing Machinery, May 1987, pp. 181-195.
Timos K. Sellis, "Multiple-Query Optimization," 1988, pp. 23-52.
Concurrency Control in B+-trees Databases..., Mond & Raz (1985), pp. 331-334.
Efficient Locking for Concurrent Operations on B--Trees, Lehman & Yao (Dec. 1981), pp. 650-670.

Primary Examiner—Eddie P. Chan
Attorney, Agent, or Firm—Mason, Fenwick & Lawrence

[57] ABSTRACT

A method and apparatus for controlling a B+ tree structure having dual transverse directional links on a leaf of the B+ tree structure. The method includes a step of carrying out a lock to a partial tree structure so as to descend from a root to the leaf at the necessary side of a partial tree structure in the case where the leaves at both sides of the partial tree structure are changed, and a step of using the lock in order to finally lock the leaves at both of the sides of the partial tree structure.

8 Claims, 8 Drawing Sheets excellent# CONCURRENT PROCESSING CONTROLLING METHOD AND APPARATUS ON B+ TREE STRUCTURE This application is a continuation of U.S. patent application Ser. No. 07/515,642, filed Apr. 25, 1990, now abandoned, which is a continuation of U.S. patent application Ser. No. 07/150,431, filed Jan. 29, 1988, now abandoned.

BACKGROUND OF THE INVENTION

This invention relates to a concurrent processing controlling method and apparatus for computer programs on a B+ tree structure. There are various memorizing methods for data in processing the computer program, such as Hash, B tree. Lehamn P. L. and Yao S. B. "Efficient Locking for Concurrent Operation on B-trees" ACM TODS 6.4 (December 1981) pp 650-670 describes a concurrent processing control system on a B+ tree structure having transverse links on all nodes. This conventional control system, however, can not expand to the dual-direction links. Also, Mond Y and Raz Y. "Concurrency Control in B+-trees Database using Preparatory Operation" Proc. of VLDB 85, (1985) pp 331-334 describes a control method carried on deforming B+ tree, in which individual controls are independently done on the leaf portions and the other portions. There is another product of VSAM (IBM) using an algorithm similar to that above. The product has a demerit that links are only uni-directional type and that the whole volume of the tree structure is not decreased after deleting.

As mentioned above, according to the prior art, it has only the kind of uni-directional links, and the control on leaf portions and the other portions are done separately.

SUMMARY OF THE INVENTION

An object of this invention is to provide a concurrent processing controlling method and apparatus on B+ tree structure having dual-direction links on its leaf portions.

According to this invention, the object mentioned above is attained by a concurrent processing controlling method on B+ tree structure having dual transverse directional links on a leaf of said B+ tree structure, comprising; a step of carrying out a lock to a partial tree structure so as to descend from a root to said leaf at a necessary side of a partial tree structure in a case where said leaves at both the sides of said partial tree structure is changed, and a step of using said lock in order to finally lock said leaves at both the sides of said partial tree structure, and a concurrent processing controlling apparatus on B+ tree structure having dual transverse directional links on a leaf of said B+ tree structure, comprising; means for carrying out a lock to a partial tree structure so as to descend from a root to said leaf at a necessary side of a partial tree structure in a case where said leaves at both the sides of said partial tree structure is changed, and means for using said lock in order to finally lock said leaves at both the side of said partial tree structure.

According to the method and the apparatus of this invention, when the algorithm according to this invention is applied to a data base, the sequential reading and renewal are integratedly and concurrently controlled to decrease the possibility of deadlocks.

BRIEF DESCRIPTION OF THE DRAWINGS

Explanation will now be made to prefered embodiments of this invention refering to the accompanying drawings.

The embodiments to be described below are only means for providing a clear understanding of this invention. Various changes and modification could be made by those skilled in the art without departing from the invention clearly defined in the attached sheet.

DETAILED DESCRIPTION OF THE PREFERRED EMBODIMENTS

In the detailed explanation below, a deformed B+ tree structure provided with dual transverse directional links at the leaves are presumed and it is called a DL-B tree structure. This invention consists of the algorithm of four operations such as inserting, deleting, searching, and sequential reading on the DL-B tree structure.

Figure 2:
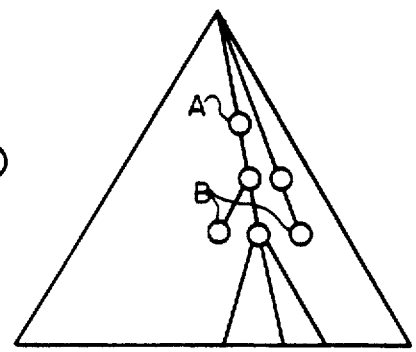
FIG. 2 is a diagramatic view of the B+ tree structure.

FIG. 2 shows a B+ tree structure, in which A is a route on which a renewal is proceeded to and B shows the situation in which these nodes at both the sides of the portional tree to be renewed are always locked and it reaches the leaf as shown in the drawing.

Figure 1:
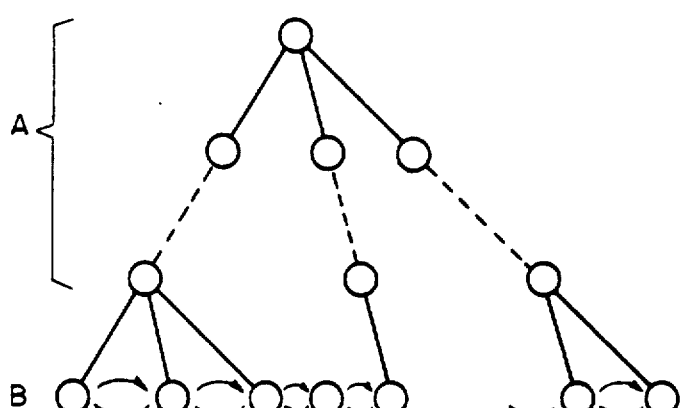
FIG. 1 is an illustrative view of a tree structure concerning one embodiment of this invention.

FIG. 1 is a B+ tree structure for explaining this invention. A concurrent processing control can be done to the B+ tree structure on the leaf of which a pointer called a cursor pointing the key on the leaf is provided. The pointer is used in sequentially reading. These keys are sequentially read according to the moving of the cursor.

The search according to this method enables to find the smallest key of the keys which are greater than a ceratain key. The insertion according to this method enables to sequentially change the mode downwardly by previously dividing the node which is not i-safe (when one key is inserted to the node an overflow of the key is happened).

The B+ tree structure which is the object of this invention is shown below.

1. The distance (h) from a leaf to a root is constant.
2. The nodes other than the roots and the leaves have at least (k−1) of the key and (k) sons.
3. The nodes other than the leaves has at most (2k+1) of keys and (2k+2) of sons.
4. The root is the leaf or has at least one key and two sons.
5. The leaf has at least one datum and at most (2k+1) data and has not data other than the leaves.
6. Each leaf has pointers for both adjacent leaves.
7. All non-leaf-nodes have the shapes as shown in FIG. 2. They are expressed by the following.

$$P_0 K_1 P_2 \text{-----} K_n P_n$$

wherein, Pi indicates sons. The key in the sub-tree T indicated by Pi has a relationship with keys at the node as shown below.

$$Ki < \min \text{ key of } T < \max \text{ key of } T \leq Ki+1$$

8. The value of key in the leaf is not overlapped. The kinds of accessing to B⁻ tree structure is shown below.
1. Searching
   1) Searching the same key as the given key.
   2) Searching the smallest key of the keys which are larger than the given ken.
   3) Searching the smallest key of the keys which are smaller than the given key.
2. Reading
   1) Reading a pair of the datum and the key ahead of that the cursor indicates.
   2) Reading a pair of the datum and the key back of that the cursor indicates.
3. Inserting
   A pair of the datum and the key is given and it is inserted to B⁺ tree structure.
4. Deleting
   Key is given and a pair of the key and the datum according to the given key is deleted.

Figure 3:
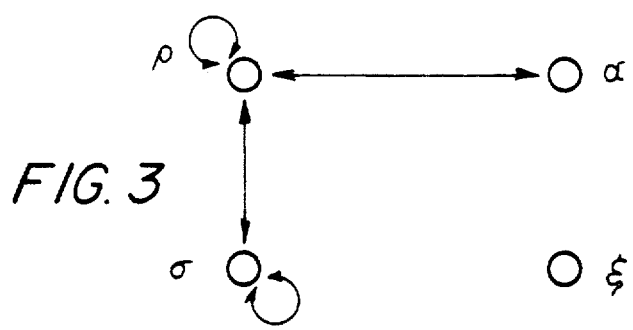
FIG. 3 is an illustrative view explaining a compatibility of a lock mode.

There are four kinds of locking modes of $\rho, \sigma, \alpha$ and $\xi$, it has a compatibility as shown in FIG. 3, in which the two joined with an arrowed line are compatible. It is shown in Table 1.

TABLE 1

|   | $\rho$ | $\sigma$ | $\alpha$ | $\xi$ |
|---|---|---|---|---|
| $\rho$ | o | o | o | x |
| $\sigma$ | o | o | x | x |
| $\alpha$ | o | x | x | x |
| $\xi$ | x | x | x | x | wherein, o shows a compatibility and x is a non-compatibility.

These meanings of locking modes, $\rho$, $\sigma$, $\alpha$, $\xi$ are shown below.

$\rho$: used by a reader.

The leaf node and non-leaf-node are locked by this mode. The leaf on which the cursor is placed is locked by this mode. The pointers to the key, the data, the son in respective node can be read. This lock mode can not deal with any pointer moving transversely.

$\sigma$: used when the reader carries out sequentially reading operations.

Before the pointer moved transversely in a leaf mode is read, this mode locks a leaf node and advances the cursor to the advanced leaf, then the lock is made free.

$\alpha$: used when a writer corrects the transverse pointer of the leaf node. The leaf node provided with a pointer to be rewritten is locked with this mode to reject $\sigma$-lock, so that invasion of a reader to the changed portion is blocked. As mentioned above, it is attained by only rewriting the pointer, it is compatible with the locking for reading elements in the leaf or the $\rho$-locking. Usually, this lock mode is functioned on only leaves, however during deletion the lock mode is applied to non-leaves.

$\xi$: used to change the key, the data, and the pointer of the node. A writer can lock both the leaf mode and non-leaf-mode.

Concerning the lock of searches, there are two kinds of searching the same key as the given key and of searching other key larger than the given key. These kinds of searching will be explained.

I. Case in which the same key as the given key is searched
   1. To hold $\rho$-lock on the root node. To set a current node to the root.
   LOOP:
   2.a. When a current node is a leaf:
      2.a.1 To search keys at the current node. If a key is found; to return a data with OK. If any key is not found; to release the lock of the current node and to return the error.
   2.b. When a current node is a non-leaf;
      2.b.1 To search i satisfying the equation $Ki <$ given key $< ki+1$.
      2.b.2 To hold $\rho$-lock the son indicated by Pi.
      2.b.3 To release the lock of the current node.
      2.b.4 To make the current node a son used in 2.b.2.
      2.b.5 To go to LOOP.

After the searching is succeeded, the leaf including the found key is held by $\rho$-lock. A cursor is set on the found key. This cursor is used in sequential reading. This sequence is similarly used in searching the key larger than the given key.

II. Case in which the key larger than the given key is searched
   1. To hold $\rho$-lock on the root node. To set a current node to the root.
   LOOP:
   2. a. When a current node is a non-leaf;
      2.a.1 To search i satisfying the equation $Ki <$ given key $< Ki+1$.
      2.a.2 To hold $\rho$-lock on the son indicated by Pi.
      2.a.3 To release the lock of the current node.
      2.a.4 To make the current node a son used in 2.a.2.
      2.a.5 Go to LOOP.
   2.b. When the current node is a leaf;
      2.b.1 To search at the current node. When the key is found, to return a data of OK. When any key is not found, to carry out the process after 2.b.2.
      2.b.2 To $\sigma$-lock the current node.
      2.b.3 To read the pointer to the next node. When the pointer is NULL, to release $\rho$-lock and $\sigma$-lock now on effect and to return the error. If the pointer is not NULL, the following steps will be done.
      2.b.4 To hold $\rho$-lock on the leaf node indicated by the pointer obtained in step of 2.b.3.
      2.b.5 To release the $\rho$-lock and $\sigma$-lock of the current node.
      2.b.6 To make the current node the node locked by the step of 2.b.4.
      2.b.7 To return the smallest key and data in the current node.

III. Case in which the key smaller than the given key is searched
   1. In the step of 2.b.3, replace "next" by "previous". That is, to read the pointer to the previous node.
   2. In the step of 2.b.7, replace "smallest" by "largest". That is, to return the largest key and data in the current node.
   3. Lock of Sequential reading When the cursor is set by the sequential reading and the searching, the sequential reading can be processed. The sequential reading has the three method thereof as shown below.

(1) To read a pair of the key and the datum indicated by the cursor. Because the leaf including the key indicated by the cursor is $p$-locked, it is sufficient to read the leaf without change of the lock.

(2) To read the next pair of the key and the datum which the cursor indicates.
   a. When the next key is in the same leaf; Because the leaf including the key the cursor indicates is $p$-locked, to proceed one the cursor and to read the leaf without change of the lock.
   b. When the next key is not in the same leaf;
      1) To hold $\sigma$-lock on the leaf including the key which the cursor indicates.
      2) To read the pointer to the next leaf node by using $\sigma$-lock held on the leaf.
         a) When the Pointer is NULL; To release $\sigma$-lock and $p$-lock and to return "end of file".
         b) When the pointer is not NULL;
            1. To hold $p$-lock on the leaf which the pointer indicates.
            2. To release $\sigma$-lock and $p$-lock of the current leaf.
            3. To transfer the cursor to the proceeding end of the next leaf and to return a set of the key and the data there.

(3) To read a pair of the key and the datum previous to that the cursor indicates. In the step of 2, replace "next" by "previous". That is, to read a pair of the key and the datum previous of that the cursor indicates.

Figure 4:
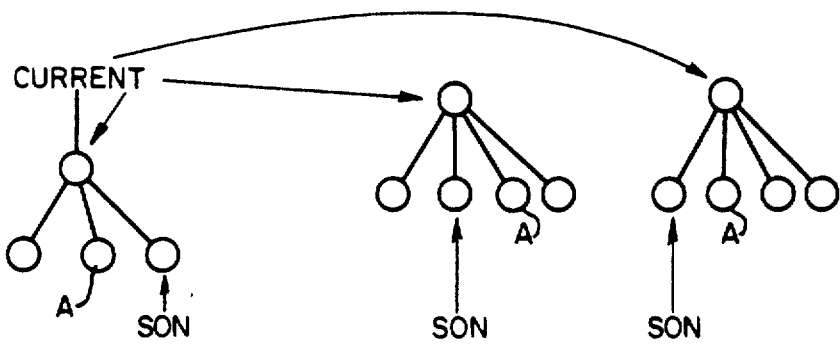
FIGS. 4 to 8 are illustrative views for explaining the inserting locking.
Figure 5:
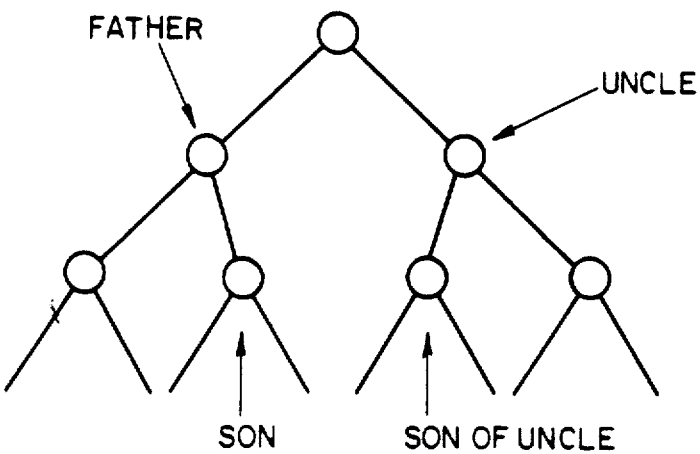
Figure 6:
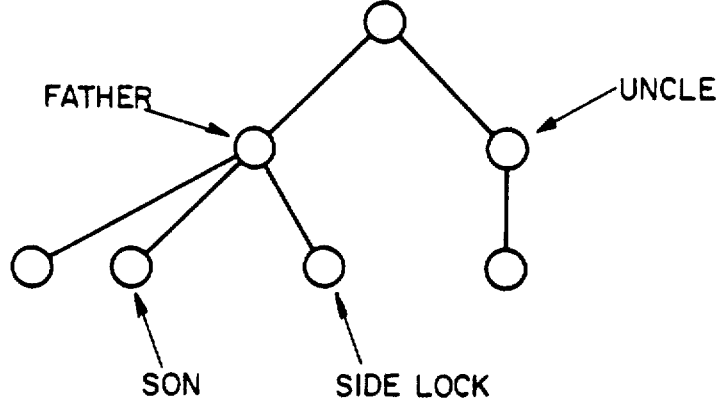

IV. Lock of Inserting
1. To hold $\xi$-lock on the root. To make the current node become a root.
LOOP:
2.a. When the current node is set to a non-leaf and the son is a non leaf.
   2.a.1. To search i satisfying the equation $ki < $ given key $\leq Ki + 1$
   2.a.2. To hold $\xi$-lock on the son indicated by Pi.
   2.a.3.
      (1) When the son is i-safe, that is, the number of keys in the node is smaller than 2 m;
         a. To release the lock of the current node.
         b. To make the current node the son indicated by Pi.
         c. Go to LOOP.
      (2) When the son is not i-safe;
         a. As shown in FIG. 4, to hold $\xi$-lock on the adjacent node (shown in the drawing by A).
         b. When the adjacent node A and the node of the son can be balanced in content; to rewrite the adjacent node A, the node of the son, the current node to make them balanced. If not so, to split the son into two nodes and to rewrite the current node.
         c. Contrary to the node splitted or balanced, to make the node including the key to be inserted become newly a son.
1. When the son is placed at the far right end of father node (FIG. 5).
   1) When a uncle node is existed and it is held by a side lock, to hold the side lock the left end son. The side lock means an $\alpha$-lock.
   2) To release the lock of uncle node.
   3) To release the lock of father node and to set the current node to a son.
2. When a son is not placed at far right end of father node (see FIG. 6).
   1) When the uncle node is held by the side lock, to release the side lock of the uncle node.
   2) To hold the side lock the node at the right of the son.
   3) To release the lock of father node and to set the current node to a son. Then, except for that a son is not at the far right of the tree, when a side-lock is held to a node adjacent to the current node, a series of locking is applied to from the root to the leaf. When the son descends along the far right side (see FIG. 7), any side lock is not held.
   d. To release the lock of the node other than a son.
   e. To set a currend node to a son.
   f. go to LOOP.
2. b When the current node is set to a non-leaf and the son is a leaf;
   2.b.1 To search i satisfying the equation $Ki <$ given key $\leq ki + 1$.
   2.b.2 To hold $p$-lock on the leaf indicated by Pi. This leaf is called a current leaf.
   2.b.3 When the current leaf is i-safe;
      (1) To release the $p$-lock of 2.b.2 and to $\xi$-lock the current leaf.
      (2) To put a pair of the key and the datum to the leaf.
      (3) To release all locks to finish the operation.
   2.b.4 When the current leaf is not-i-safe;
      (1) To search the next leaf of the current leaf from the pointer on the current leaf and to $\alpha$-lock the next leaf.
      (2) To release the $p$-lock from the current leaf and to $\xi$-lock the current leaf.
      (3) To split the current leaf (B) shown in FIG. 8 ($a$) into two leaves (B), (B') as shown in FIG. 8 ($b$), to rewrite the current node to indicate a new leaf and to rewrite the pointer to the leaf previous of ($c$). Where, at this instance, the current node is held by $\xi$-lock, the current leaf(B) is held by $\xi$-lock and the current leaf (C) is held by $\alpha$-lock.
      (4) To release all locks on the non-leaf-node and locks on the next leaf and the current leaf, and to finish the operation.

V. Lock of Deletion
1. To hold $\xi$-lock on the root. To make the current node a root.
LOOP:
2.a When the current node is set to a non-leaf and the son is a non-leaf
   2.a.1 To search i satisfying the equation of $Ki <$ given key $\leq ki + 1$.
   2.a.2 To hold $\xi$-lock on the son indicated by Pi.
   2.a.3 (1) When the son is not d-safe, that is, the number of key in the node is smaller than (m);
      a. To hold $\xi$-lock on the adjacent node.
      b. If the adjacent node is balanced in content with the son, to make them balance. If they are not balanced, to combine them.
      c. Comparing to the node combined or balanced, to make the node having the key to be deleted newly a son.

Figure 9:
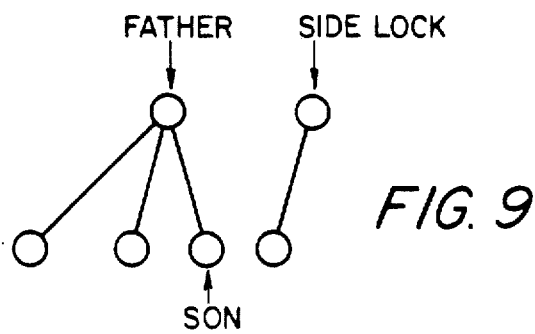
FIGS. 9 to 11 show examples of deletion locking.

2.a.4 (1) When the son is placed at the far right of father node: As shown in FIG. 9, when a side lock is already existed at the right side, to hold the side lock on the far left son of the sons.

Figure 10:
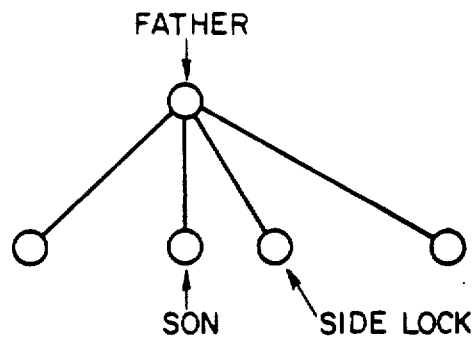

2.a.4 (2) Case other than (1): As shown in FIG. 10, when a side lock is already existed, to release the side lock. To hold the side lock the node at the right side of the son.

2.a.5 To carry out the process shown in 2.a.4 on the left side lock.

2.a.6 To release the lock of the father.

2.a.7 To make the current node the son.

2.a.8 go to LOOP:

2.b. When the son is a leaf;

2.b.1 To search the son and to hold $p$-lock on the son.

2.b.2 When the key to be deleted is not existed on the son, to return with an error indication.

2.b.3 When the number of elements of the son is more than 1;
  (1) To hold $\xi$-lock on the son.
  (2) To delete a pair of the key and the datum in the leaf.
  (3) To release all locks to return.

Figure 11:
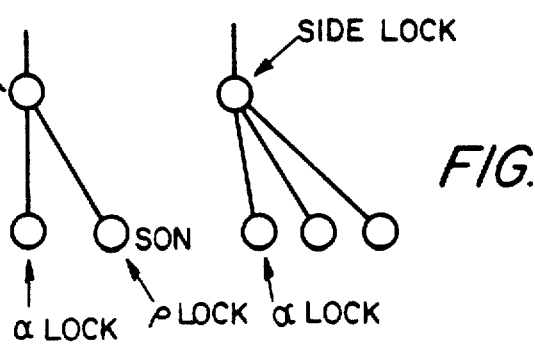

2.b.4 When the number of elements of the son is 1;
  (1) As shown in FIG. 11, to hold $\alpha$-lock on the leaf left side of the son.
  (2) To hold $\alpha$-lock on the leaf right side of the son. Where, in the cases of (1), (2), the leaf to be held by $\alpha$-lock is the son of the node held by the side lock or the son of the current node.)
  (3) To hold $\xi$-lock on the son.
  (4) To delete it to again join the link.
  (5) To release all locks to return.

As apparent from the explanation above, when the algorithm according to this invention is applied to a data base, the sequential reading and renewal are integratedly and concurrently controlled to decrease the possibility of deadlock.

Figure 22:
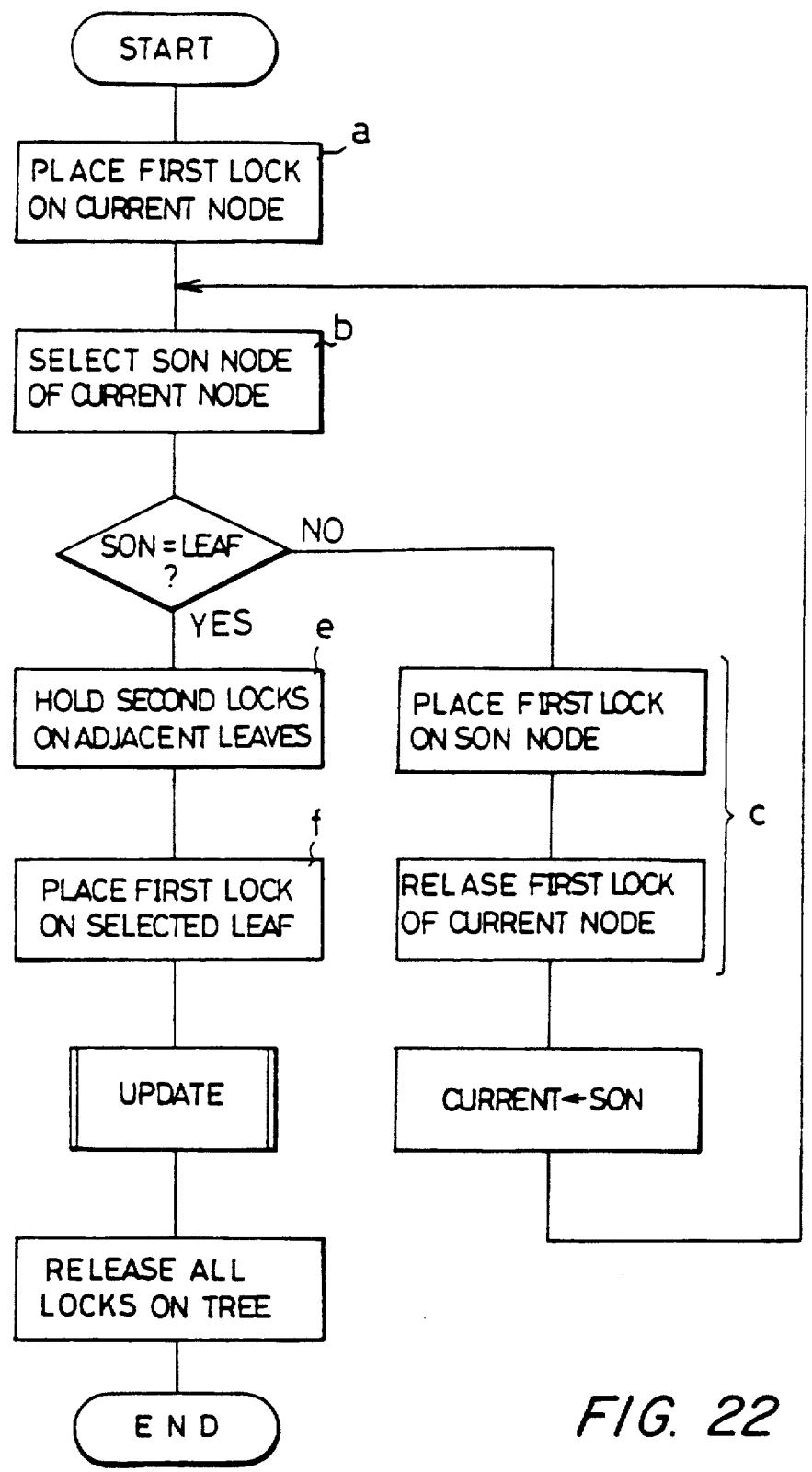
FIG. 22 illustrates in flow chart form a concurrency control method for a plurality of processes on a B+ tree structure using a supervised program in a computer system.

Based on the foregoing descriptions, it is apparent that the present invention may be summarized in a flow chart such as that illustrated in FIG. 22. In particular, FIG. 22 illustrates a flow chart of a concurrency control method for a plurality of processes on a B+ tree structure using a supervised program in a computer system. In particular, the B+ tree structure is assumed to have:

(1) one root;

(2) a plurality of nodes, each of nodes being coupled to at least one descendant adjacent node and having at least one key and associated pointer for designating one of descendant adjacent nodes;

(3) a plurality of leaves, each of the leaves connected to adjacent leaves through dual direction transverse links, each of the leaves having another pointer for designating one of the adjacent leaves;

(4) first locks used in respective processes for preventing a node's content from being changed by another process; and (5) second locks used in respective processes for prohibiting said respective processes from referring said another pointer of a leaf to prevent one leaf from being accessed through a transverse link in another process.

The method comprises the steps of:

(a) placing one of the first locks on a node in each of the processes to be concurrently controlled, in order to ensure the content of the node for each of the processes;

(b) selecting one of descendant adjacent nodes according to the pointer of the node by comparing said at least one key of the node with a given key in each of the processes;

(c) when the selected descendent adjacent node is not one of the leaves, placing another first lock on the selected descendant adjacent node and releasing the node from the one of the first locks;

(d) repeating steps (b) and (c) in order that an access of each of the processes descends in a direction from a root toward a leaf on the tree and until a leaf to be updated is selected in the step (b);

(e) holding the second locks in the one of the processes on the adjacent leaves located adjacent the one leaf, in order to prohibit another concurrent process from referring the another pointer of one of the adjacent leaves; and (f) placing a first lock on the one leaf to ensure the content of the one leaf.

The above steps (a)–(f) are specifically illustrated by corresponding drawing reference designators a–f in FIG. 22.

The operational effect of this invention will be described in detail in the manner of proofing of each Lemma or Theorem.

I. On the Correctness of Interaction

Lemma 1

When inserters, an inserter and a deleter, deleters are concurrently operated, the desired change is assured.

Proof

On the non-leaf-node, all portions to be changed are held by $\xi$-lock, so that proper deletions are carried out in a case where a plurality of processes are concurrently operated. On these processes, all locks on the leaf are excluded, so that the renewal operation is properly carried out.

Lemma 2

When a reader and an inserter are simultaneously functioned, the desired change is assured.

Proof

Because only an inserter changes the tree structure, the change is carried out properly. It is sufficient to assure that movement of the cursor of the reader is right.

Figure 12:
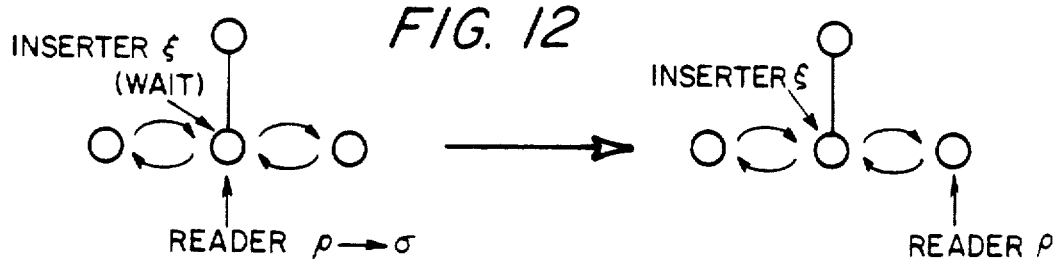
FIGS. 12 to 21, respectively, illustrative views of explaining the effect of this invention.
Figure 13:
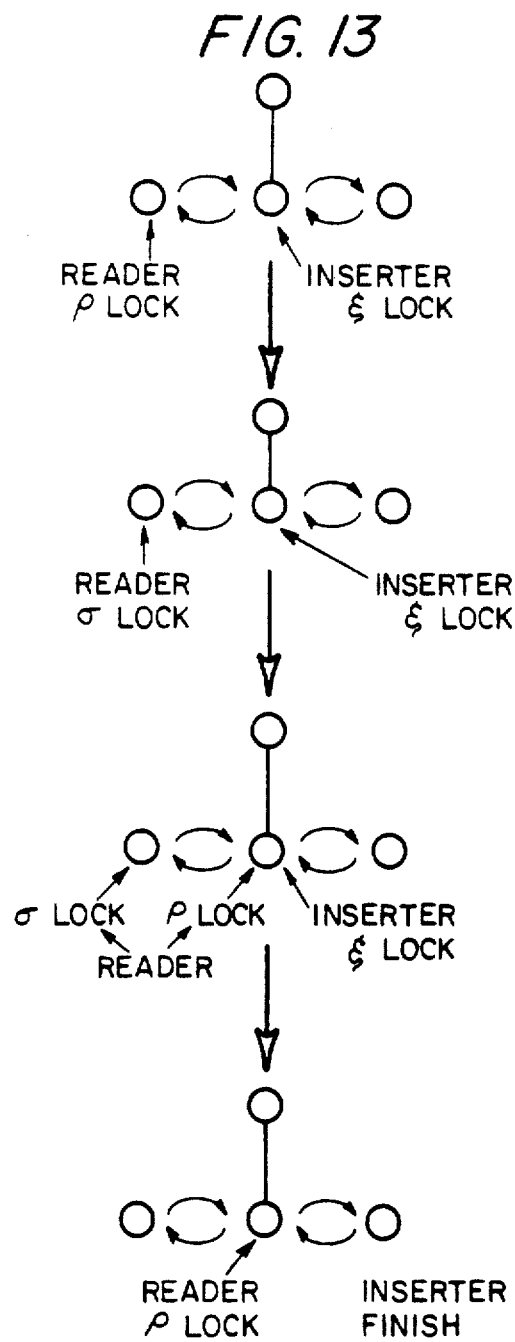

1. Case in which an inserter can not divide the leaf.
  1.1 When the cursor exists on the leaf the inserter changes (see FIG. 12). The inserter holds $\xi$-lock on that leaf and the locked condition is continued until the reader transfers the cursor to the front or rear leaf by means of a sequential reading. Consequently, because the reader reads the leaf before it is changed by the inserter, the cursor can be moved correctly to the front and the rear.
  1.2 When the cursor is placed on the leaf adjacent to leaf changed by the inserter (see FIG. 13). It is a controversy that when a reader holds $p$-locks on the leaf and the locked condition is continued, during the inserter holds $\xi$-lock in order to rewrite the leaf. In other cases other than these above, they don't intervene to each other or the cursor can be moved correctly to the front and the rear as described in 1.1 above. In this case, the reader is adapted to read the smallest (largest) key in the leaf after the inserter changes it, so that the cursor moves correctly.

Figure 14:
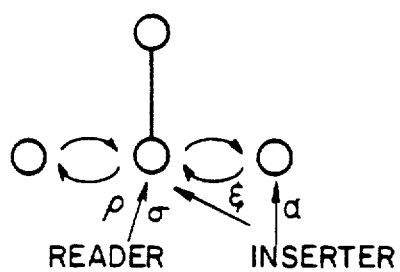

2. When the leaf is divided by the inserter (see FIG. 14)

2.1 When the cursor is on the leaf to be changed by the inserter. The lock which the inserter carrys out is the $\alpha$-lock and the $\xi$-lock, and the $\alpha$-lock and the $\rho$-lock are respectively compatible. Because the inserter can not rewrite a pair of the key and the data which rewrites the pointer to the side of the adjacent leaf it results in the case of 1.1.

Figure 15:
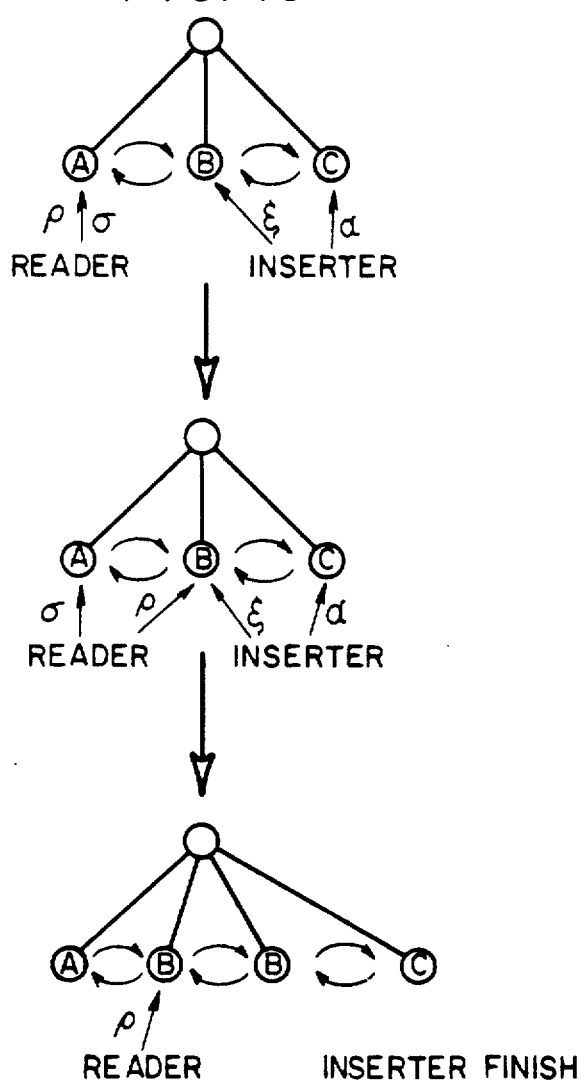

2.2 When the cursor is at a front of the leaf changed by the inserter and the cursor progresses along plus direction (see FIG. 15). When a $\rho$-lock is held on the leaf to be changed by the reader before the inserter holds $\xi$-lock thereon, it results in the case of 2.1. As a result, it is sufficient to think only the case that, after the inserter holds $\rho$-lock, the reader holds $\rho$-lock on the leaf and the locked condition is continued. In this case, because that according to the insertion rule, the order of the key is B', B" and C, reading the smallest key in the key B' can read the "next" key of the largest key of (A). Consequently, the cursor moves correctly.

2.3 When the cursor is placed at the rear of the leaf changed by the inserter and the cursor progresses the reverse direction.

2.3.1 When the reader holds $\rho$-lock on the leaf before the inserter holds $\xi$-lock thereon, it results in the case of 2.1.

Figure 16:
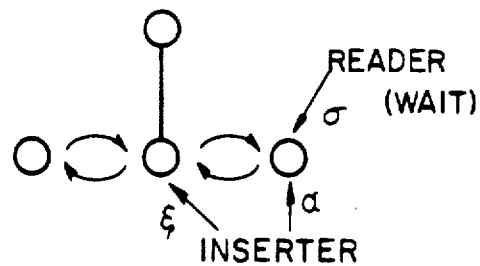
Figure 17:
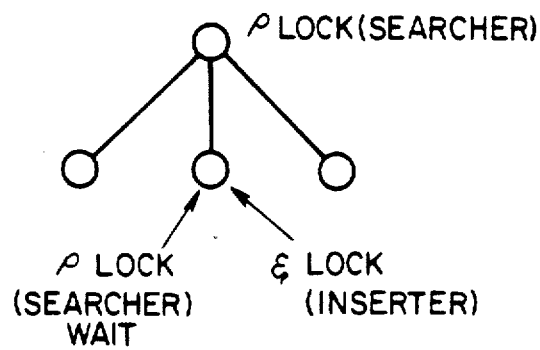

2.3.2 When the reader holds $\rho$-lock on the leaf to be changed after the inserter holds $\xi$-lock (see FIG. 16).

2.3.3 When the reader holds $\sigma$-lock on the right adjacent leaf before the inserter holds $\alpha$-lock on it, the inserter is waiting at the $\alpha$-lock condition. After the $\sigma$-lock of the reader is released, it results in the case of 2.1.

Lemma 3

When the deleter and the reader concurrently move, the desired change is assured.

Proof

Lemma 3 is obvious when the leaf is not deleted. When the leaf is deleted, Lemma 3 is right as the cases shown in 2.1 and 2.3 of Lemma 2.

Lemma 4

When the inserter, the deleter and the searcher move simultaneously, the desired change is assured.

Proof

When the inserter, the deleter, and the searcher access to the non-leaf-node all together, the similar result as shown in Lemma 1 is obtained. In a case where the inserter, the deleter and the searcher accesses simultaneously on the leaf node, the searcher and the reader carries out the same function on the leaf, so that the desired change is assured as described in Lemma 2.

Theorem

When these functions of insertion, deletion, reading, and searching are simultaneously processed on DL-B tree structure, the desired change is assured.

Proof

It is apparent from Lemma previously described that the result of these portions shown below will be assured.

|  | inserter | searcher | reader |
|---|---|---|---|
| inserter | Lemma 1 | Lemma 2 | Lemma 3 |
| searcher | — | A | B |
| reader | — | — | C |

Because A, B, and C, respectively, are not changed and all locks to be applied are compatible, they are not interfered to each other. So that, even they are processed concurrently the same result as that when single is processed will be obtained. Thus, the desired change is assured on all combinations.

II. ON FREE FROM DEADLOCK

Lemma 1

All searching-searching, reading-searching, reading-reading are free from deadlock.

Proof

Only $\rho$-lock and $\sigma$-lock are held by searching and reading, and they are compatible. Accordingly, there is no happening of waiting, so that they are free from deadlock.

Lemma 2

A lock applied to the non-leaf by searching and reading is free from deadlock.

Proof

After the father node is locked, both searching and inserting lock the son. Because a lock is initially held on the root, they are made free from deadlock.

Lemma 3

No dead lock is happened when the lock which is held on the leaf first by searching is made wait.

Proof

Figure 7:
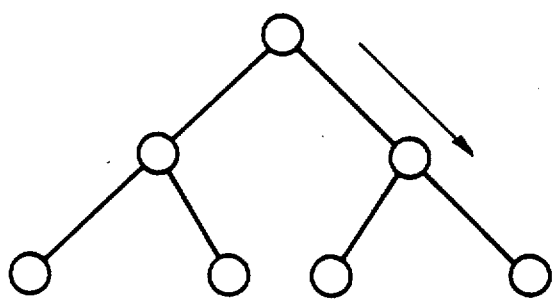
Figure 8:
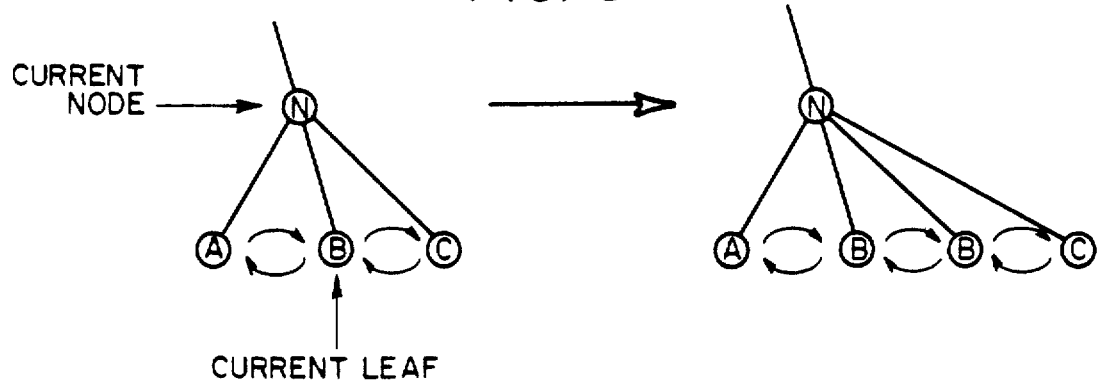

The lock the searching initially held on the leaf is the $\rho$-lock and the lock which is not compatible with it is only $\xi$-lock (FIG. 7). Consequently, in order to make wait of a $\rho$-lock, it is necessary to hold $\xi$-lock on the leaf by means of the inserter. The $\rho$-lock is held on the father node by the searcher, so that the inserter doesn't hold a $\xi$-lock on the father node.

According to the definition of lock of the inserter, only when the son is i-safe or the father's lock is released after finishing of splitting operation, the $\xi$-lock is hold on the son, not on the father. Because the inserter demands no more the locking after then, no deadlock is happened.

Lemma 4

After all locks of the reader and non-leaf-node are released, the searcher has the same lock mechanism.

Proof

It is apparent from the definition of searching and reading.

Lemma 5

Inserting to inserting is free from deadlock.

Proof

Figure 18:
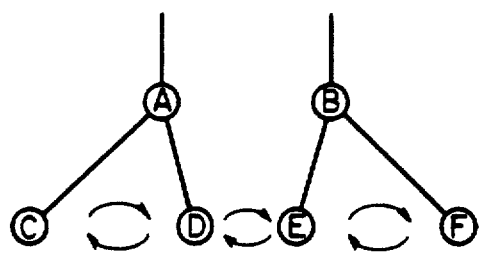

The lock on non-leaf is free from deadlock similar to the case of Lemma 2. When no leaf splitting is happened, it is free from deadlock. When the both insertings have a leaf splitting and two leaves adjacent to each other are splitted, it is a problem (FIG. 18).

In this case,

The lock on the inserter (a) is held on the order of (A)-$\xi$-lock, D-$\alpha$-lock, E-$\alpha$-lock, D-$\xi$-lock and on the inserter (b) is on the order of (B)-$\xi$-lock, E-$\alpha$-lock, F-$\alpha$-lock, E-$\xi$-lock.

Only the locks on the leaf E are interfered to each other in three cases as shown in the Table 2 below.

TABLE 2

| lock on E | $\rightarrow$ time | | |
|---|---|---|---|
| 1 | a-$\alpha$. | b-$\sigma$. | b-$\xi$ |
| 2 | b-$\sigma$, | a-$\alpha$. | b-$\xi$ |
| 3 | b-$\sigma$. | b-$\xi$. | a-$\alpha$ |

In case of 1, b waits, resulting in no dead lock. In case of 2, because that $\alpha$-lock $\rightarrow\xi$-lock operation of (b) is carried out before $\alpha$-locking operation, (a) is waited properly, resulting in no deadlock.

In case of 3, (a) waits, resulting in no deadlock. Therefore, no deadlock is happened on the inserters to each other.

Lemma 6

The inserter and the reader are free from deadlock.

Proof

Only the lock on the leaf is made problem.

Figure 19:
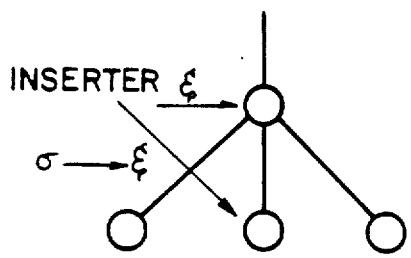
Figure 20:
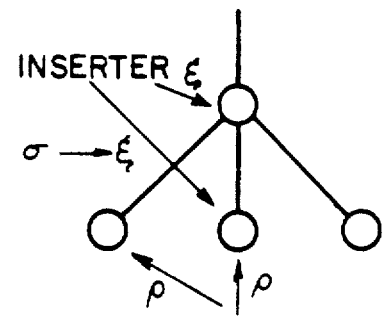

(1) When the inserter doesn't split the leaf: The cases in which the reader is interfered with inserter are shown below.
1. When the cursor exists on the leaf to be inserted (FIG. 19). When the cursor moves to the front and the rear, the lock is released, resulting in no deadlock. Concerning $\sigma$-lock, $\rho$-lock and $\sigma$-lock are compatible, so that the inserter doesn't interfere with the function of the reader.
2. When the cursor exists at adjacent position of the leaf to be inserted and it moves to the leaf to be inserted (FIG. 20). $\rho$-lock of the reader is exclusive from $\xi$-lock of the inserter. When $\rho$-lock is held before $\xi$-lock is held, the case results in that of 1. When it is not so, until finishing of insertion, the reader waits, resulting in no dead locking.

Figure 21:
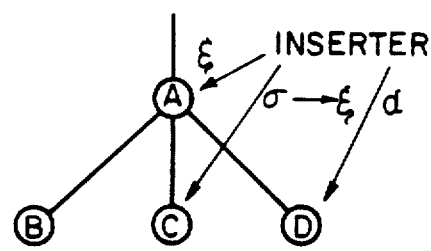

(2) When the inserter generates leaf splitting (see FIG. 21). The following two cases are differed from the case of (1) and the rest cases are resulted in the case of (1).
1. When the cursor is moved from the leaves at the front and the rear to the leaf to which the inserter holds $\alpha$-lock by the reader. Because $\alpha$-lock and $\rho$-lock are compatible, no waiting is happened and therefore it is free from deadlock.
2. When the reader transfers the cursor from the leaf on which the inserter holds $\alpha$-lock to the leaf to be inserted. These locks are held on the order as shown below.

| | 1 | 2 | 3 |
|---|---|---|---|
| inserter | (C) - $\rho$ | D - $\alpha$ | (C) - $\xi$ |
| reader | D - $\rho$ | D - $\sigma$ | (C) - $\rho$ |

D-$\alpha$-lock and D-$\sigma$-lock, (C)-$\xi$-lock and (C)-$\rho$-lock are excluded from each other, however, because that second lock which is first held can hold the third lock, no deadlock is happened.

Lemma 7

The inserter and the deleter are free from deadlock.

Proof

It is apparent that when the leaf is not deleted. When the leaf is deleted, that the second lock which is first held can hold the third lock, as similar to the case of the inserter, so that it is free from deadlock.

Lemma 8

These inserter, deleter, and searcher are free from deadlock.

Proof

Until the searcher holds a lock to the leaf according to Lemma 2 and Lemma 3, it is free from deadlock. After that it is free from deadlock according to Lemma 4 and 6.

Theorem

Any combination of the two of reading, searching, inserting, and deleting is free from deadlock to each other.

Proof

It is apparent from Lemma 1, 5, 6, 7 on free from deadlock.

What is claimed is:

1. A concurrency control method for a plurality of processes on a B+ tree structure using a supervised program in a computer system, in which the B+ tree structure has:
   (1) one root;
   (2) a plurality of nodes, each of nodes being coupled to at least one descendant adjacent node and having at least one key and associated pointer for designating one of descendant adjacent nodes;
   (3) a plurality of leaves, each of the leaves connected to adjacent leaves through dual direction transverse links, each of the leaves having another pointer for designating one of the adjacent leaves;
   (4) first locks used in respective processes for preventing a node's content from being changed by another process; and
   (5) second locks used in respective processes for prohibiting said respective processes from referring said another pointer of a leaf to prevent one leaf from being accessed through a transverse link in another process;
   the method comprising the steps of:
   (a) placing one of the first locks on a node in each of the processes to be concurrently controlled, in order to ensure the content of the node for each of the processes;

(b) selecting one of descendant adjacent nodes according to the pointer of the node by comparing said at least one key of the node with a given key in each of the processes;
(c) when the selected descendent adjacent node is not one of the leaves, placing another first lock on the selected descendant adjacent node and releasing the node from the one of the first locks;
(d) repeating steps (b) and (c) in order that an access of each of the processes descends in a direction from a root toward a leaf on the tree and until a leaf to be updated is selected in the step (b);
(e) holding the second locks in the one of the processes on the adjacent leaves located adjacent the one leaf, in order to prohibit another concurrent process from referring the another pointer of one of the adjacent leaves; and
(f) placing a first lock on the one leaf to ensure the content of the one leaf.

2. The concurrency control method of claim 1, wherein the step of holding the second locks includes:
preventing a leaf's content from being changed by another process.

3. The concurrency control method of claim 1, wherein the step of holding the second locks includes:
preventing the leaf from being read by another process.

4. The concurrency control method of claim 1, further comprising a step of:
selecting one of the side leaves according to the another pointer of the leaf, to permit sequential access of each process to adjacent leaves via links in one direction.

5. The concurrency control method of claim 1, further comprising a step of:
updating the one leaf in the one of the processes while the second locks are held in the adjacent leaves.

6. The concurrency control method of claim 5, wherein said updating step includes a node deletion process.

7. The concurrency control method of claim 5, wherein said updating step includes a node insertion process.

8. The concurrency control method of claim 5, wherein said updating step includes a node deletion process and a node insertion process.

* * * * *